United States Patent
Penning

(10) Patent No.: US 6,378,366 B1
(45) Date of Patent: Apr. 30, 2002

(54) CAM DRIVE FOR A TEMPERATURE SENSITIVE DEVICE

(75) Inventor: Klaus Penning, Alfhausen (DE)

(73) Assignee: G. Kromschröder Aktiengesellschaft (DE)

( * ) Notice: Subject to any disclaimer, the term of this patent is extended or adjusted under 35 U.S.C. 154(b) by 0 days.

(21) Appl. No.: 09/517,568

(22) Filed: Mar. 2, 2000

(30) Foreign Application Priority Data

Mar. 2, 1999 (DE) .......................................... 199 09 025

(51) Int. Cl.[7] .................................................. G01F 3/02
(52) U.S. Cl. ........................................................ 73/233
(58) Field of Search .......................... 73/262, 233, 281, 73/268

(56) References Cited

U.S. PATENT DOCUMENTS

| | | | | |
|---|---|---|---|---|
| 4,538,458 A | * | 9/1985 | Bruce et al. ................... | 73/233 |
| 4,747,306 A | * | 5/1988 | Kiriloff ........................ | 73/233 |
| 5,272,294 A | * | 12/1993 | Charboneau et al. ......... | 200/83 |
| 5,317,927 A | * | 6/1994 | Farr et al. ................. | 73/861.01 |
| 5,329,966 A | * | 7/1994 | Fenimore et al. ........... | 137/613 |
| 5,861,546 A | * | 1/1999 | Sagi et al. ................ | 73/861.52 |

* cited by examiner

Primary Examiner—Max Noori
(74) Attorney, Agent, or Firm—Blakely Sokoloff Taylor & Zafman

(57) ABSTRACT

The cam drive exhibits a part rotable about an axis. The part is unrotatably connected to a cam element. A swivel arm for a sensing element is pivot-mounted on the cam element. A temperature-dependent compensation element is provided which is supported on the cam element and engages in the swivel arm to determine the position thereof. The sensing element is arranged on the swivel arm such that it can be moved and engages in a recess of the cam element. The recess is adapted to the type-specific temperature dependence of the temperature-sensitive device which the cam drive forms a part of. The error curve of the temperature-dependence device can be optimized by appropriate radial and tangential adjustment of the sensing element (stroke and advance), caused by the compensation element and determined by the corresponding design of the recess.

10 Claims, 1 Drawing Sheet

CAM DRIVE FOR A TEMPERATURE SENSITIVE DEVICE

BACKGROUND OF THE INVENTION

1. Field of the Invention

The invention relates to a cam drive for a temperature-sensitive device, in particular for a diaphragm gas meter, with

- a part rotatable about an axis,
- at least one cam element, which is unrotatably connected to the rotatable part,
- at least one swivel arm which is pivot-mounted on the cam element,
- a transmitting or sensing element which is connected to the swivel arm and
- a temperature-dependent compensation element, which determines the angular position of the swivel arm.

2. Description of the Prior Art

Diaphragm gas meters have at least one chamber which is divided into two by a moveable diaphragm. The two chambers are connected alternately to a gas inlet and a gas outlet. Cyclical changeover is performed by a slide valve system whose movements backwards and forwards are initiated by the diaphragm, namely by the activation of the cam drive, the cam element being driven by the diaphragm whilst the slide valve system is driven by the rotatable part.

Generally, the rotatable part is designed as a shaft whilst the transmitting or sensing element is a crank pin. Cam drives of different designs are also conceivable. For example, the rotatable part can be a simple disk whilst the sensing element can be designed as a boring in which a bolt engages.

The cam drive has an extremely wide field of use. The invention will, however, be described as used in a diaphragm gas meter since this is considered to be the preferred use of the invention.

Diaphragm gas meters are temperature-sensitive, above all with regard to dependence of the gas density on temperature (3K corresponding to a volume change of approx. 1%). The gas is supplied in buried gas pipes and is therefore substantially at a constant temperature. If the room in which the diaphragm gas meter is installed also has a substantially constant temperature, obviously no problems occur. However, there are problems when the diaphragm gas meter is installed on the outside wall of a building and subjected to temperature fluctuations which may easily be 60 to 70K. Here the temperature-dependent compensation element is activated which determines the angular position of the swivel arm.

From practice it is known to arrange the swivel arm such that the compensation element adjusts the sensing element substantially radially to the axis of the rotatable part. This causes the stroke of the diaphragm of the diaphragm gas meter to change. The volume which can pass through the meter per counting unit therefore adjusts to the prevailing outdoor temperature.

SUMMARY OF THE INVENTION

It has been found that temperature compensation of the cam drive is still in need of improvement. Therefore, it is an object of the invention to improve the temperature compensation of the cam drive.

To achieve this object, the aforementioned cam drive is characterised in that the transmitting or sensing element can be adjusted relative to the swivel arm by a control means which is adapted to the type-specific temperature dependence of the particular temperature-sensitive device.

The invention is based on the fact that the temperature-dependence of the device, for example the diaphragm gas meter, is type-specific. This was previously not allowed for in temperature compensation. Therefore, there were different error curves for different types of meter which meant that a temperature compensation feature which was adjusted to suit a certain meter type and was sufficiently accurate for such a meter type produced inadmissible error curve deviations with other meter types.

By contrast, in the present invention the control means is adapted to the type-specific temperature dependence of the device. The swivel arm still carries out a temperature-dependent adjustment of the cam stroke as a function of the compensation element. This adjustment is superposed by the intervention of the control means which adjusts the sensing element relative to the swivel arm. Therefore, the error curve can be optimised for each type of meter using the control means.

Above all, it is possible to adjust the sensing element not only radially but also tangentially to the axis of the rotatable part. Thus the offset angle of the sensing element to the cam element and thus to the rotatable part changes. In use in the diaphragm gas meter this means that the advance of the slide valve control, related to the stroke movement of the diaphragm, is changed. While a radial adjustment of the sensing element through the stroke of the diaphragm causes a shift in the entire error curve in the direction of the zero line, a tangential adjustment leads to a flattening of the error curve. Therefore, a type-specific optimisation of temperature compensation can be achieved.

One embodiment of the invention proposes that the control means is linked to the temperature-dependent compensation element as the latter already represents a temperature sensor, the control means preferably being linked to the compensation element via the swivel arm of the sensing element, whose angular position is determined by the compensation element and thus represents a temperature-dependent value.

A particularly advantageous embodiment is characterised in that the control means exhibits a coulisse or recess in the cam element, in which recess the sensing element is guided. The simplest way of setting the characteristics of this temperature compensation feature is the shape of the recess. If the compensation element performs a swivelling of the swivel arm, the sensing element is adjusted simultaneously relative to the swivel arm. Cam stroke and advance are therefore adapted to the relevant temperature by one and the same activation of the compensation element.

Particularly favourable conditions are achieved by the fact that the sensing element can be adjusted relative to the swivel arm in the direction of the pivot point of said swivel arm.

The pivot point of the swivel arm can be arranged at any point on the cam element. The shifting of the sensing element superposed with the swivel movement of the swivel arm allows any design of the recess.

It is particularly advantageous to arrange the pivot point of the swivel arm eccentrically to the axis of the rotatable part on the cam element. The swivel arm can, under these circumstances, be aligned substantially tangentially to the cam element so that the forces introduced into the sensing element can be transferred via the guide walls of the recess to the cam element without substantial loading of the swivel arm.

Given this aspect, it is particularly advantageous for the line between the sensing element and the pivot point of the swivel arm to form a substantially right angle with the line between the sensing element and the axis of the rotatable part.

One embodiment of the invention proposes that the temperature-dependent compensation element is supported on the cam element and exhibits an actuating arm acting in an articulated manner on the swivel arm, said actuating arm being directed substantially away from the pivot point of the swivel arm. The transmission ratio between the actuating arm of the compensation element and the swivel arm can in this manner be very easily preselected as it depends on the distance between the pivot point of the swivel arm and the engagement point of the actuating arm.

It is advantageous for the actuating arm of the compensation element to be designed as a free end of a spiral-shaped bimetal element.

The invention is explained in more detail in the following with the aid of a preferred embodiment and the attached drawing.

DETAILED DESCRIPTION OF THE INVENTION

Figure 1:
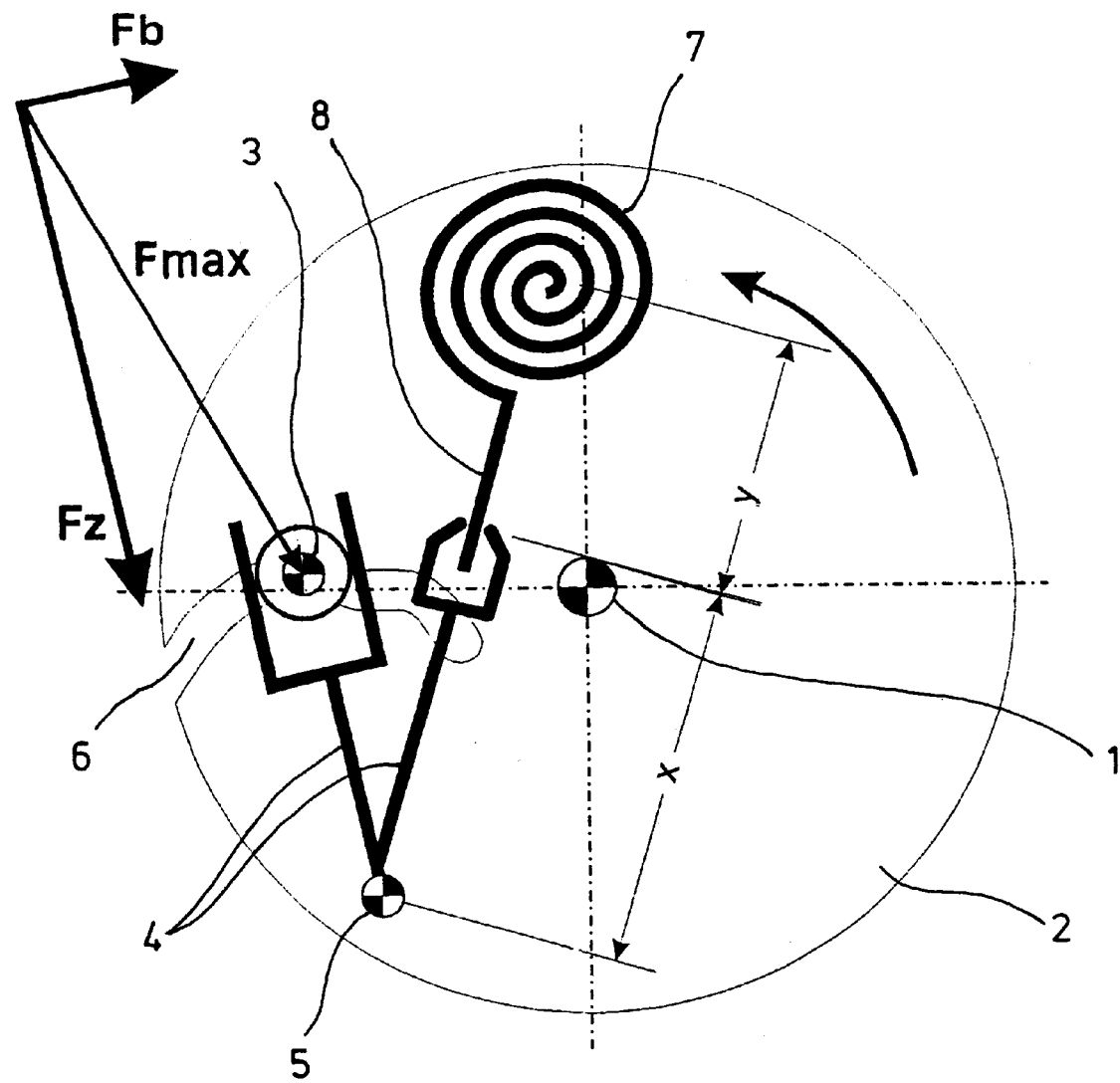
FIG. 1 shows a schematic outline of a cam drive.

The cam drive according to FIG. 1 exhibits a rotatable part 1 in the form of a shaft which is unrotatably connected to a disk-shaped cam element 2. The cam element 2 carries a transmitting or sensing element 3 in the form of a crank pin. The cam drive is intended for a temperature-sensitive device, in the present case for a diaphragm gas meter. The diaphragm of the diaphragm gas meter can be moved backwards and forwards and is connected to the crank pin and drives the shaft in this way. The latter has at least one eccentric to activate a slide valve system and is furthermore connected to a counter.

The sensing element 3 is adjustably arranged in a swivel arm 4 which is mounted in a pivot point 5 on the cam element 2. Furthermore, the sensing element 3 engages in a coulisse or recess 6 of the cam element 2.

For temperature compensation the cam drive is provided with a compensation element 7, in the present case with a spiral-shaped bimetal element whose free end forms an actuating arm 8. Said actuating arm 8 engages in an articulated manner—preferably via a knife-edge bearing system—in the swivel arm 4 and is directed substantially away from the pivot point 5 of said swivel arm 4. When the temperature changes, the compensation element 7 adjusts the angular position of the swivel arm 4. This changes the position of the sensing element 3 relative to the axis of the rotatable part 1 both in radial and tangential direction. An adjustment in the radial direction changes the stroke of the diaphragm (when the temperature rises, the stroke increases), an adjustment in the tangential direction changes the advance of the slide valve system.

The path of the recess 6 is determined experimentally as a function of the ratio of error parts and is adapted to the type-specific temperature dependence of the relevant diaphragm gas meter. In this way the stroke of the diaphragm and the advance of the slide valve system can be exactly adjusted to the relevant outdoor temperature. An optimised path of the error curve (plotted against the volume flow) is the result. The path of the recess 6 is individually adapted to the meter type.

From the manufacturing point of view, the great advantage of this invention is that a large number of meter types can work with one and the same cam drive, only the recess 6 of the cam element 2 having to have a different design. Further modifications—if necessary—are also perfectly possible using standard components. For example, FIG. 1 shows the distances X and Y which determine the transmission ratio between the compensation element 7 and the swivel arm 4. A change and adjustment of the transmission ratio is therefore readily possible, either by moving the compensation element or by changing the swivel arm.

The pivot point 7 of the swivel arm 4 is located eccentrically to the axis of the rotatable part 1. The arrangement is made such that the main component Fz of the maximum force to be transmitted Fmax is introduced by the sensing element 3, which is moveably connected in the direction of the pivot point 5 of the swivel arm 4 to the latter, via the recess 6 direct into the cam element 2. The axis of the rotatable part 1, the pivot point 5 of the swivel arm 4 and the sensing element 3 form a substantially right-angled triangle whose hypotenuse runs between the axis of the rotatable part 1 and the pivot point 5.

It is of considerable significance that the compensation element 7 is not influenced by the forces to be transmitted via the sensing element 3.

The cam drive permits very small dimensions so that very small meter sizes are also possible.

Modifications are also possible within the scope of the present invention. However, the preferred basic layout will generally be retained, where the axes of the shaft and crank pin are aligned parallel to each other whilst the compensation movement of the swivel arm takes place in a plane vertical to said axes. Instead of the spiral-shaped bimetal compensation element, other temperature sensors can be used, preferably those which generate sufficiently large adjusting forces without power assistance. The eccentric bearing mounting of the swivel arm is, as explained, particularly advantageous but it is also possible to relocate the pivot point of the swivel arm to the axis of the shaft by designing the recess accordingly. In any case it must be ensured that the kinematics are such that, on the one hand, small temperature changes cause appreciable movements of the crank pin and, on the other hand, a large temperature range is available for compensation. The basic setting of the cam drive takes place at an average normal temperature of 15° C. or 20° C. At this temperature the swivel arm adopts a defined position so that the crank pin is also in a defined position. This position must be adjusted by corresponding advance of the diaphragm stroke and the slide valve advance. In contrast to FIG. 1, the cam element is adjusted as a whole element in relation to the shaft such that the crank pin is exactly positioned both in tangential and radial direction.

What I claim is:

1. A cam drive for a temperature-sensitive device belonging to a type of device which has a type-specific temperature-dependence, in particular for a diaphragm gas meter, said cam drive comprising a part rotatable about an axis at least one cam element which is unrotatably connected to the rotatable part, at least one swivel arm which is pivot-mounted on the cam element, a sensing element which is connected to the swivel arm and is adjustable relative to the swivel arm by a control means which is adapted to the type-specific temperature-dependence of the temperature-sensitive device, and a temperature-dependent compensation means which determines the angular position of the swivel arm relative to the cam element.

2. The cam drive as claimed in claim 1, wherein the control means is linked to the temperature-dependent compensation means.

3. The cam drive as claimed in claim 2, wherein the control means is linked to the temperature-dependent compensation means via the swivel arm of the sensing element.

4. The cam drive as claimed in claim 1, wherein the control means exhibits a recess in the cam element in which recess the sensing element is guided.

5. The cam drive as claimed in claim 1, wherein the swivel arm exhibits a pivot point and the sensing element is adjustable relative to the swivel arm in the direction of said pivot point.

6. The cam drive as claimed in claim 1, wherein the swivel arm exhibits a pivot point and the pivot point of the swivel arm is arranged eccentrically to the axis of the rotatable part on the cam element.

7. The cam drive as claimed in claim 6, wherein a line running between the sensing element and the pivot point of the swivel arm forms a substantially right angle with a line running between the sensing element and the axis of the rotatable part.

8. The cam drive as claimed in claim 1, wherein the swivel arm exhibits a pivot point and wherein the temperature-dependent compensation means is supported on the cam element and exhibits an actuating arm engaging in an articulated manner in the swivel arm, said actuating arm being directed substantially away from the pivot point of the swivel arm.

9. The cam drive as claimed in claim 8, wherein the actuating arm of the compensation means is designed as the free end of a spiral-shaped bimetal element.

10. The cam drive as claimed in claim 1, wherein the control means exhibits a recess in the cam element, in which recess the sensing element is guided, and wherein the compensation means exhibits a bimetal element which is connected to the swivel arm.

* * * * *